March 30, 1954  B. J. DENNISON ET AL  2,673,822
PRELIMINARY PRESSING OF BENT LAMINATED GLASS
Filed Aug. 8, 1951  4 Sheets-Sheet 1

INVENTORS
BROOK J. DENNISON
LAURENCE A. KEIM and
WILLIAM G SMITH

Oscar L. Spencer
ATTORNEY

March 30, 1954   B. J. DENNISON ET AL   2,673,822
PRELIMINARY PRESSING OF BENT LAMINATED GLASS
Filed Aug. 8, 1951   4 Sheets-Sheet 3

INVENTORS
BROOK J DENNISON
LAURENCE A. KEIM
WILLIAM G. SMITH
BY Oscar L. Spencer
ATTORNEY March 30, 1954  B. J. DENNISON ET AL  2,673,822
PRELIMINARY PRESSING OF BENT LAMINATED GLASS
Filed Aug. 8, 1951  4 Sheets-Sheet 4
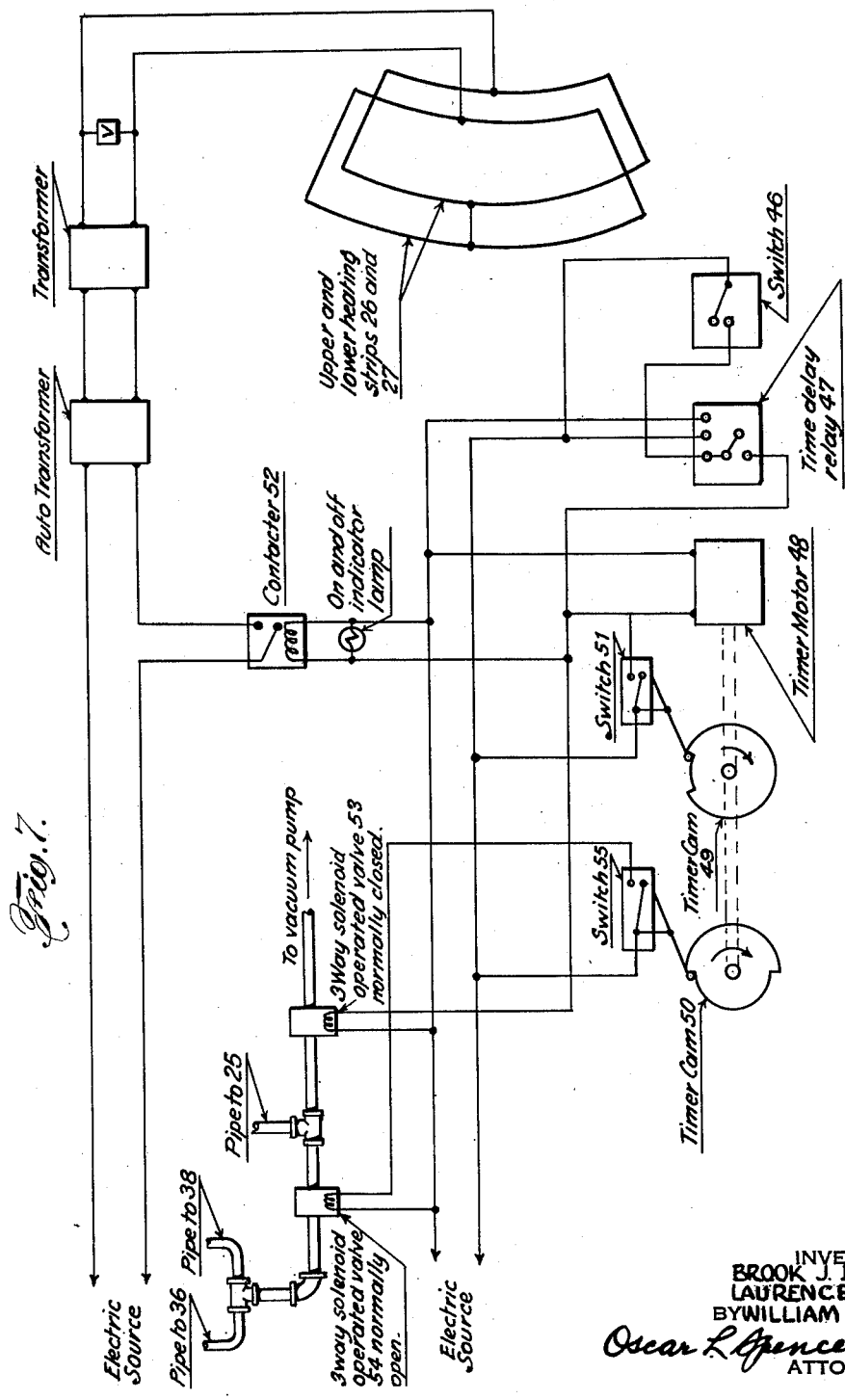
INVENTORS
BROOK J. DENNISON
LAURENCE A. KEIM and
BY WILLIAM G. SMITH
Oscar L. Spencer
ATTORNEY Patented Mar. 30, 1954

2,673,822

UNITED STATES PATENT OFFICE 2,673,822

PRELIMINARY PRESSING OF BENT LAMINATED GLASS

Brook J. Dennison and Laurence A. Keim, Brackenridge, and William G. Smith, Tarentum, Pa., assignors to Pittsburgh Plate Glass Company Application August 8, 1951, Serial No. 240,884

14 Claims. (Cl. 154—2.7)

This invention relates to methods and apparatus for making laminated glass and plastic sheets, commonly known as safety glass, and particularly sheets of bent or curved form. Such sheets usually consist of two glass sheets with a sheet of thermoplastic material therebetween and adhesively bonded thereto. They are widely used in places where resistance to shattering is important, as in automobiles for example.

In the manufacture of such laminated sheets, it is customary to obtain the final, overall, adhesive bond between the glass sheets and the interposed thermoplastic sheet by subjecting the assembled sheets to heat and pressure while immersed in oil in an autoclave. Unless the edges of the sheets are sealed or otherwise protected, however, the oil in the autoclave may penetrate between the laminations and discolor the sheet. In the manufacture of flat laminated sheets, therefore, it has been customary to subject the assembled sheets to a preliminary pressing by passing them between one or more pairs of rolls covered with suitable resilient material, sometimes called nipper rolls. This operation forced the air out from between the assembled sheets and provided a sufficient seal extending over the entire area of the sheets to prevent damage from the oil in the autoclave.

In the manufacture of bent or curved laminated sheets, however, such for example as curved windshield panels, curved lenses for goggles, and the like, the use of nipper rolls has not been satisfactory. Because the sheets are bent or curved, it is practically impossible to obtain a uniform pressure over the entire area of the assembled sheets with the nipper rolls, and consequently there is danger of penetration of oil at the edges, and of excessive breakage of glass. As an alternative, it has been customary practice to place the assembled laminated sheets in a flexible container, for example a rubber bag, which was then evacuated to hold the assembled sheets in proper position during the autoclave operation. In this case, of course, even though there was no preliminary sealing of the edges of the laminations, penetration of oil between the laminations was prevented by the bag. This method, while producing a satisfactory product, has been expensive, cumbersome and time-consuming in operation.

It is an object of the present invention to provide a method and apparatus for subjecting the assembled laminated sheets to a preliminary pressing operation which results in a sealing of the marginal edge portions of the assembled sheets so that they may be placed directly in an autoclave without danger of edge discoloration due to penetration of oil.

Another object of the invention is to provide apparatus in which air may be removed from between the assembled sheets, and in which the marginal edge portions thereof may be sealed against penetration of oil, with small danger of breakage of the glass.

It is a further object of the invention to provide apparatus in which such sealing operation may be performed rapidly, economically, and partly automatically.

Other objects and advantages of the invention will appear hereinafter.

A preferred apparatus suitable for carrying out our method has been selected for purposes of illustration and is shown in the accompanying drawings, wherein:

Figure 6 is a fragmentary vertical section through one of the electrode terminals for conducting current to the resistance heating elements; and Figure 7 is a schematic diagram showing the electric system for controlling automatically the application of vacuum and heat to the press during the steps of the preliminary pressing operation.

According to the present invention we first assemble the glass and thermoplastic sheets in superimposed relation with the thermoplastic sheet interposed between the glass sheets. We then seal said sheets along a marginal area extending inwardly a limited distance from the peripheral edges of the assembled sheets by applying heat and pressure to said marginal area, leaving unsealed the remaining area enclosed by said marginal area. By thus presealing the marginal edges of the assembled sheets, the laminated assembly is prepared for final treatment under heat and pressure by direct immersion in an oil bath in an autoclave, the presealing of the marginal edges being sufficient to prevent penetration of oil between the sheets.

Preferably air is evacuated from between the superimposed sheets before the marginal seal is formed and this is preferably accomplished by applying vacuum around the peripheral edges of the assembled sheets while applying atmospheric pressure to the top and bottom surfaces thereof.

In the preferred embodiment of the invention the evacuation of air from between the sheets proceeds in two phases. During the first phase, only the inner portions of the top and bottom surfaces of the assembled sheets are subjected to atmospheric pressure, while the marginal areas of said surfaces, corresponding roughly to the areas to be sealed, are subjected to vacuum of approximately the same degree as applied around the peripheral edges. During this phase, therefore, these marginal areas are subjected to balanced pressures, and within these marginal areas the sheets are not pressed together. During this phase, however, heat is being applied to the marginal areas to soften the thermoplastic material preparatory to forming the seal.

During the second phase, the vacuum applied to the marginal areas of the top and bottom surfaces of the assembled sheets is released, while the vacuum applied around the peripheral edges is maintained, and the heating of the marginal areas continues. As a result, the entire top and bottom surfaces of the assembled sheets are subjected to atmospheric pressure, creating a pressure differential which now subjects the marginal areas to pressure which, with the heat applied, forms the desired marginal seal. After an adequate period, the heat may be turned off and the pressure on the assembled sheets may be removed by releasing the vacuum at the peripheral edges. The assembled, marginally sealed sheets are then ready for treatment in the autoclave.

Figure 3:
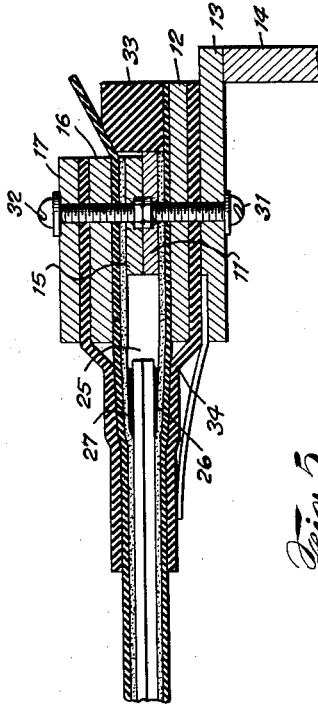
Figure 3 is a fragmentary vertical section through the press substantially on the line 3—3 of Figure 1, showing a laminated glass assembly in the press.

Referring to the drawings, a preferred form of apparatus adapted for carrying out the above method in the manufacture of laminated windshield panels of curved contour is illustrated. As shown, a lower frame comprising three members 11, 12 and 13 is mounted on a suitable base 14, and a matching upper frame comprising three members 15, 16 and 17 is hinged thereto, as by the brackets 29 and rod 30. The frame members 11, 12, 13, 15, 16 and 17, made of aluminum for example, are shaped to conform to the peripheral outline of the assembled sheets 22, 23 and 24 which make up the laminated glass, but are spaced outwardly therefrom slightly as shown in Figure 3.

The frame members 11, 12 and 13 preferably are held together by machine screws 31 passing therethrough and spaced at short intervals around the frame, and the frame members 15, 16 and 17 may be similarly held together by machine screws 32. The opposed faces of the frame members 11 and 15 are counterbored, as may be seen in Figure 3, to receive the nuts of the machine screws below the surfaces of the frame members. The combined thickness of the frame members 11 and 15 exceeds slightly the thickness of the assembled glass and plastic sheets.

A flexible diaphragm 18, for example canvas-back rubber, and an asbestos sheet 19, for example asbestos cloth, are clamped between the frame members 11 and 12, and a similar flexible diaphragm 20 and asbestos sheet 21 are clamped between the frame members 15 and 16. These flexible diaphragms are impervious to air for the purposes of the present invention, and the cloth backing, toward the inside of the press, reinforces and stiffens the rubber. The asbestos sheets 19 and 21 serve as insulation between the rubber diaphragms and the heating elements to be described hereinafter, and their edges may be stiffened and strengthened, for example by being impregnated with a cellulose acetate material.

The flexible diaphragms must be stiff enough to withstand atmospheric pressure when vacuum is applied to the space 25 between frame members 11 and 15 and the edges of the assembled sheets of glass and plastic material, without permitting collapse or compression of the diaphragms into the space 25. At the same time these diaphragms must be flexible enough so that during the second phase of the evacuation operation the pressure of the atmosphere will force the diaphragms against the edge portion of the assembled sheets of glass and plastic to effect the desired edge seal. As shown, the assembled glass sheets 22, 23 and interposed plastic sheet 24 are held between the diaphragms 18 and 20, and the space 25 formed between the diaphragms extends around the entire periphery of the assembled sheets, through which the edges of the sheets may be subjected to vacuum as hereinafter explained.

The seal around the outer edge of the two-part frame will next be described. In the illustrative embodiment the flexible diaphragm 18 is made slightly larger than the frame member 11, so that it extends out beyond this frame member entirely around the frame. Conveniently this projecting edge portion of the flexible diaphragm is supported by the outer edge portion of the frame member 12. The cloth backing is ground off from the projecting edge portion of the flexible diaphragm, and a rubber molding ring 33, extending entirely around the frame, is cemented air-tight to the diaphragm.

The edge of the flexible diaphragm 20 extends out beyond the edges of the clamping frame members 15 and 16, forming a lip 35 which is pressed against the molding ring 33 when the press is closed. The cloth backing is ground off from this lip to give a rubber-to-rubber pressure contact between the flexible diaphragm 20 and the molding ring 33. Upon subjecting the space between the two flexible diaphragms to vacuum, the lip 35 will be pressed tightly against the molding ring 33, effecting a seal, and the atmosphere also will press the flexible diaphragms 18 and 20 inwardly against the assembled sheets of glass and plastic material within the frame.

For reasons described hereinabove, the pressure which would otherwise be exerted by the flexible diaphragms 18 and 20 on the marginal edge portion of the assembled sheets when vacuum is applied will be balanced during the first phase of the evacuation operation. Preferably this will be accomplished by providing a channel extending around the inner edge of the frame, exteriorly of the space between the two flexible diaphragms, and by subjecting this channel to vacuum also. The preferred construction is shown in Figure 3.

Clamped between the frame members 12 and 13 of the lower frame is a flexible diaphragm 34 which extends entirely around the frame, and extends inwardly of the frame somewhat beyond the marginal area of the assembled glass and plastic sheets which is to be sealed. This flexible diaphragm 34 preferably is made of rubber and its inner edge portion is cemented or otherwise sealed airtight to the flexible diaphragm 18, thus providing a channel 36 extending entirely around the lower frame at the inner edge of the frame member 12, exteriorly of the flexible diaphragm 18. By subjecting the channel 36 to vacuum at the same time that the space 25 is subjected to vacuum, during the first phase of the operation of sealing the marginal area of the assembled glass and plastic sheets, the pressures will be balanced on both sides of the flexible diaphragm around the inner edge of the frame, and no pressure will be applied to the marginal area of the assembled sheets. During the second phase of the sealing operation, only the space 25 will be subjected to vacuum, the channel 36 being open to the atmosphere, and the pressure area on the assembled sheets will thus be extended to include the marginal area. Figure 3 shows the diaphragm 34 with vacuum on the channel 36, while in Figure 4 there is no vacuum on the channel.

Preferably a similar channel also will be provided at the inner edge of the frame member 16 of the upper frame. In the illustrative embodiment a flexible diaphragm 37 similar to the diaphragm 34 is clamped between the frame members 16 and 17 and is sealed along its inner edge to the flexible diaphragm 20 to provide a channel 38 extending entirely around the upper frame.

Figure 4:
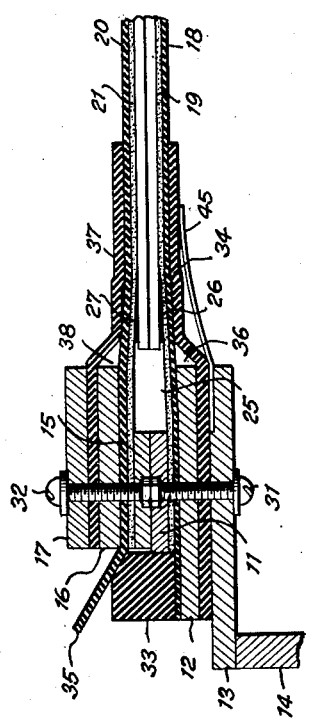
Figure 4 is a fragmentary vertical section through one of the vacuum connections to the interior of the press at the edge of the assembled sheets.

Figure 4 discloses the connection for applying vacuum to the space 25 extending around the periphery of the assembled glass and plastic sheets. One end of the tubular connector 39 extends through aligned openings in the lower frame and is secured in the frame member 11 with a threaded connection. A slot 40 is cut in the upper edge of the frame member 11 to complete the vacuum connection to the space 25 around the periphery of the assembled sheets.

Figure 5:
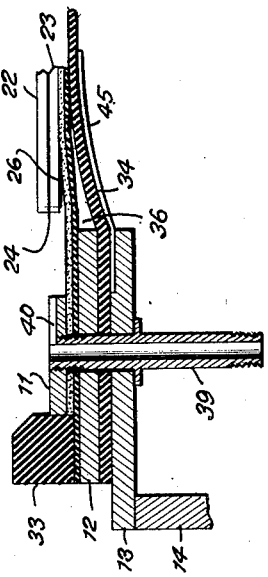
Figure 5 is a fragmentary vertical section through the vacuum connections to the exterior of the flexible diaphragm walls of the press for balancing the interior pressure over the marginal areas of the assembled sheets during the first phase of the operation.

Figure 5 shows the vacuum connections to the channels 36 and 38. Tubular connector 41 is secured in aligned openings through the lower frame members 12 and 13, and one or more openings 42 through the inner edge of the member 12 complete the vacuum connection to the channel 36. A similar connection is made to the channel 38 through the tubular connector 43 and one or more openings 44 through the inner edge of the frame member 16.

Suitable external pipe or hose connections are made to the tubular connectors 39, 41 and 43, and these connections include valves for controlling the application of vacuum or the admission of the atmosphere. A flexible connection will be made to the connector 43 in the hinged upper frame so as not to interfere with opening and closing the press.

From the foregoing description it will be seen that the assembled glass and plastic sheets are supported or floated in the press between flexible blankets, each blanket comprising a canvas-back rubber diaphragm and an asbestos cloth. These blankets conform to the contour of the glass and compensate for any minor variations in the bends in the glass, thus providing controlled uniform pressure over the assembled sheets, and greatly reducing the danger of breakage as compared to the use of nipper rolls.

Figure 1:
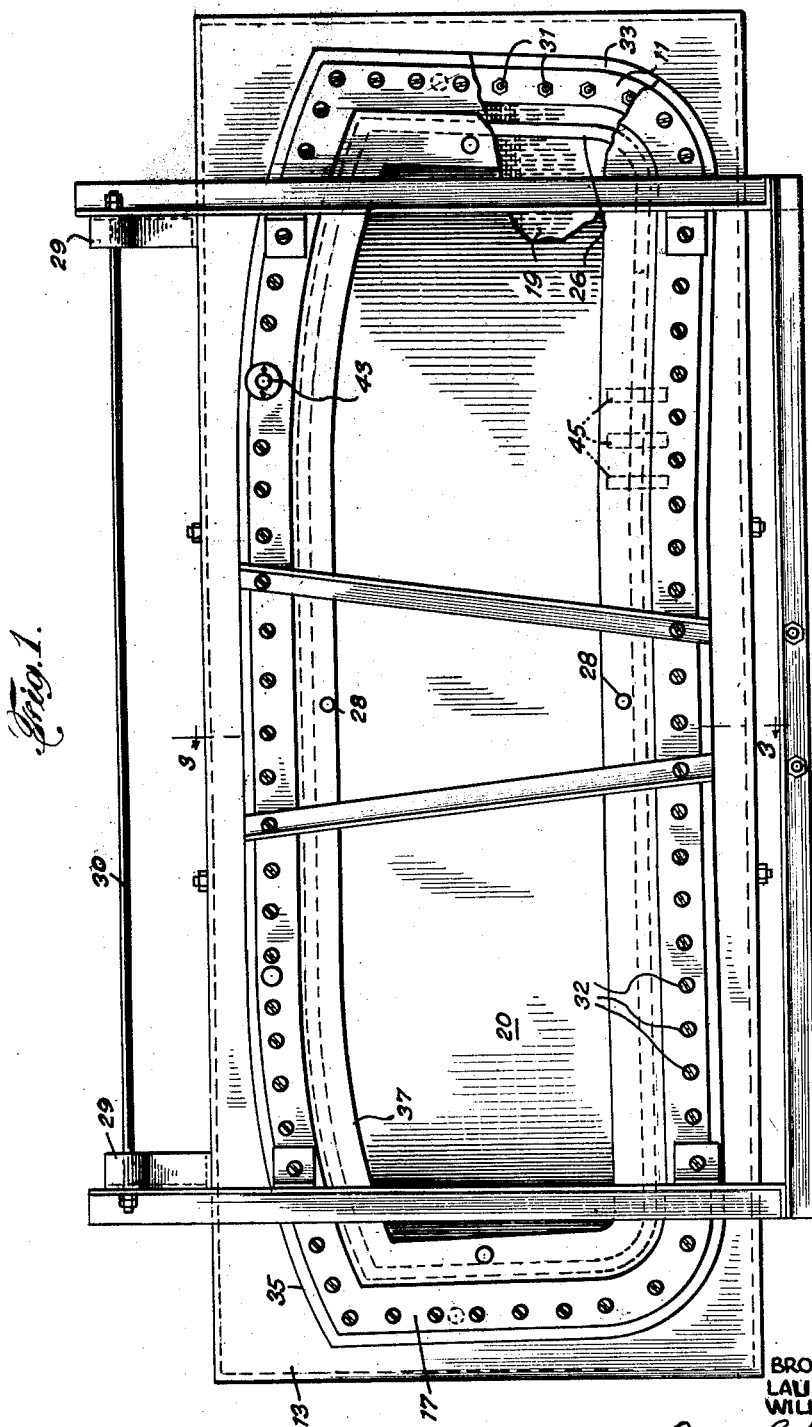
Figure 1 is a top plan view of a press for sealing the marginal edge portion of a curved sheet of laminated glass, a portion of the upper frame of the press being broken away to disclose the construction.
Figure 2:
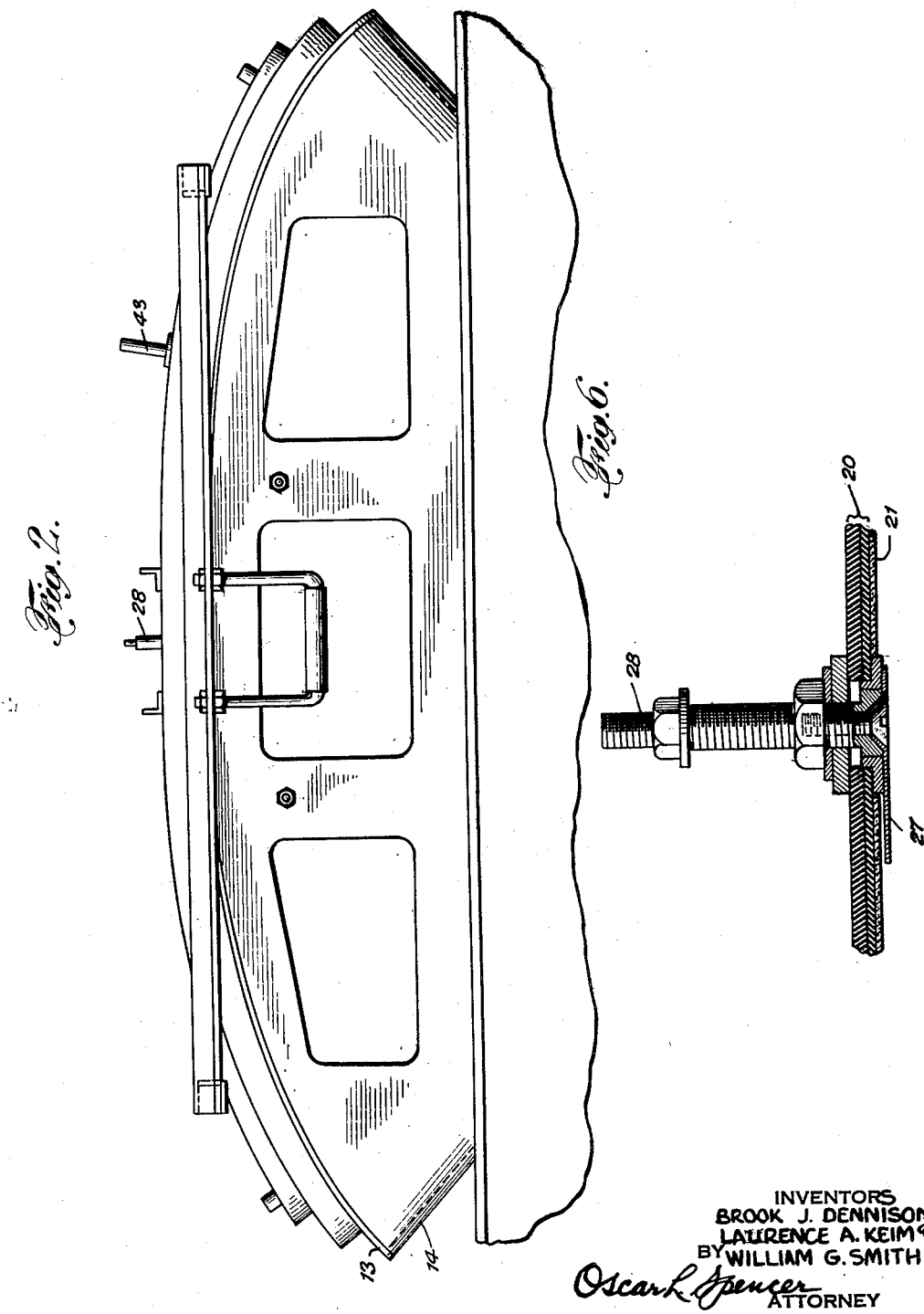
Figure 2 is a front elevation of the press shown in Figure 1.

Since the assembled glass and plastic sheets within the press rest directly on the lower blanket, it will be desirable to provide some additional means for supporting the weight of the sheets. In the illustrative embodiment such support is provided, without substantially impairing the resilient nature of the supporting surface, by a series of flat springs 45. As may be seen in Figure 3, one end of each spring is clamped between the lower frame members 12 and 13, and the free end of the spring is bent upwardly into engagement with the diaphragm 34 a short distance inside the peripheral edge of the assembled sheets within the press. Preferably one of these springs is inserted between each two screws 31 securing the lower frame members together, thus providing a resilient support for the laminated glass all of the way around the frame. In Figure 1, three of the springs 45 are shown in broken lines, the others being omitted merely for the sake of simplifying the drawing.

In the preferred embodiment electrical resistance heating has been employed, and for purposes of rapid heating, resistance elements in the form of strips 26 and 27 are secured to both of the diaphragms 18 and 20, respectively, so that the assembled sheets may be heated simultaneously from above and below. The said strips, made of stainless steel or other suitable material, conform to the peripheral outline of the assembled sheets, but are preferably spaced slightly inwardly therefrom, at approximately one-eighth inch from the edge. If the strips are so arranged, a good seal is formed, and there is no danger of decomposition of the thermoplastic due to direct application of heat to the plastic. If the strips are spaced inwardly too far, the seal will not extend to the edge of the assembled sheets, and oil may penetrate between the laminations during treatment in the autoclave.

The strips 26 and 27 are anchored to suitable terminals 28 which project through the diaphragms and are connected to a suitable current supply. Such a terminal is shown in Figure 6. The transverse dimensions of the resistance strips and the location of the terminals 28 thereon will be such as to provide uniform heat to the marginal area of the assembled sheets within the press, all of the way around the assembled sheets. In a press for sealing the marginal area of relatively thin laminated glass, such as is used in the manufacture of goggles for example, in contradistinction to automobile windshields, entirely satisfactory operation may be had with only one heating strip, which ordinarily will be the strip secured on the lower diaphragm.

Control means desirably are provided which make the operation of the press automatic insofar as the application of current to the heating strips, and the application of vacuum during the first and second phases are concerned. Figure 7 schematically discloses preferred control means, and will be referred to in the following description of the operation of sealing the marginal area of assembled glass and plastic sheets.

Two glass sheets with a plastic sheet therebetween are assembled in superimposed relation and laid on the lower flexible diaphragm blanket of the press, care being taken to see that the assembly is located on the heating strip with the edges of the assembled sheets extending beyond the strip uniformly all around. In this position the edges of the assembled sheets also will be spaced uniformly from the inner edge of the lower frame, all around. The hinged upper frame then is lowered onto the lower frame, establishing a seal between the upper and lower flexible diaphragms around the outer edge of the frame.

This closure of the press also closes an electric switch 46, conveniently mounted on the hinge, which in turn closes the time delay relay 47. The time delay relay (a) actuates the contactor 52 to supply current to the heating strips 26 and 27, (b) opens the normally closed 3-way solenoid controlled valve 53 to connect the vacuum line to the space 25 around the peripheral edge of the assembled sheets, and also to the channels 36 and 38, because the 3-way solenoid controlled valve 54 normally is open and is not actuated at this time, and (c) energizes the timer motor 48, on the shaft of which are two cams 49 and 50, which conveniently rotate at about 1 R. P. M. Within 5 to 10 seconds the timer cam 49 closes the switch 51 completes a circuit which (a) continues to energize timer motor 48, (b) holds the contactor 52 closed, and (c) holds the 3-way solenoid controlled valve 53 open to vacuum chambers 25, 36 and 38, thus permitting the time delay relay 47 to open after about 15 seconds, preparing for the next cycle, while the first cycle continues. This is the first phase of the evacuation operation, during which air is removed from the space around the periphery of the laminated sheets, while the vacuum in the channels 36 and 38 prevents the application of pressure to the marginal areas of the assembled sheets.

At the end of a predetermined time, 30 seconds in a preferred embodiment, the other timer cam 50 closes the switch 55 to close the normally open 3-way valve 54, cutting the vacuum off from the channels 36 and 38 and opening them to the atmosphere. This completes the first phase of the evacuation operation and during the second phase the area of pressure exerted by the flexible diaphrams 18 and 20 on the assembled sheets within the press is extended to include the marginal area of the laminated glass.

After a predetermined time, about 60 seconds from the start in the preferred embodiment, the cams 49 and 50 have rotated sufficiently to open both switches 51 and 55. Opening of the switch 51 permits the valve 53 to close, cutting off the vacuum from the space 25 within the press and opening it to the atmosphere. Opening of switch 51 also opens the contactor 52, cutting off the current to the heating strips 28 and 29, and stops the timer motor 48. Opening of the switch 53 permits the valve 54 to reopen to the vacuum line and close to the atmosphere, but the channels 36 and 38 are not subjected to vacuum, because the valve 53 is closed.

With the vacuum released, the upper frame of the press can be lifted for removing the laminated glass and reloading the press for the next cyle. The marginal area of the laminated glass and plastic sheets removed from the press has been sealed entirely around the periphery of the glass, but inside of this marginal area the sheets are not sealed. This assembly now is ready for direct immersion in oil in an autoclave to effect the overall sealing between the sheets.

Lifting the upper frame of the press to remove the laminated glass which has been subjected to the preliminary sealing operation opens the switch 46. For reasons of safety, the arrangement is such that the time delay relay 47, which opened at 15 seconds after the closing of switch 46 during the first cycle, cannot be reclosed until after the switch 46 has been opened, and then reclosed by closing the press after completion of the reloading operation. Upon reclosing the press, the heating and evacuation cycle is repeated as described above to seal the marginal area of another assembly of glass and plastic sheets.

It will be evident from the foregoing description that the operation of the press is substantially automatic after initiation, the operation being initiated by closure of the electric switch 46 when the press is closed on the assembled glass and plastic sheets therein.

It will be understood that the invention herein described may be modified and embodied within the scope of the subjoined claims.

We claim:

1. In the manufacture of bent laminated glass and plastic sheets comprising two sheets of bent glass with a sheet of thermoplastic material therebetween, the method of presealing the marginal area only of the assembled sheets preparatory to direct immersion in an autoclave where they will be subjected to heat and pressure, which method includes the steps of assembling said sheets in superimposed relation, evacuating air from between said sheets, heating a narrow marginal area only of said sheets extending around the periphery thereof, and applying pressure to the heated narrow marginal area of the assembled sheets to seal the glass sheets to said thermoplastic sheet along said marginal area while leaving unsealed the remaining area enclosed by said sealed marginal area.

2. The method set forth in claim 1 in which the evacuation of air from between said assembled sheets includes the steps of applying vacuum around the peripheral edges of said assembled sheets while applying atmospheric pressure to the central areas only thereof.

3. The method set forth in claim 1 in which, during the first phase of the evacuation of air from between said sheets, said marginal area is subjected to heat without pressure.

4. Apparatus for presealing the marginal area only of laminated glass and plastic sheets comprising two sheets of bent glass and a sheet of plastic material therebetween assembled in superimposed relation, which apparatus comprises, in combination, a base, a two-part frame which circumscribes the assembled sheets and conforms to the peripheral outline thereof with a small space between the peripheral edges of the assembled sheets and the inner edge of the frame, said two-part frame comprising a lower frame secured on the top of said base and a matching upper frame hinged to the base so that it can be lowered onto the lower frame and lifted therefrom, a flexible diaphragm secured around its edge to the lower frame for supporting the assembled sheets, a flexible diaphragm secured around its edge to the matching upper frame overlying the assembled sheets, heating means for applying heat to a marginal area only of the assembled sheets extending around the periphery thereof, and a connection for applying vacuum to the space within the frame around the peripheral edges of the assembled sheets.

5. Apparatus according to claim 4, in which the lower frame includes resilient means extending inwardly of the frame a limited distance and supporting the lower flexible diaphragm.

6. Apparatus according to claim 4, including a resilient member circumscribing the frame and providing a seal between the flexible diaphragm around the outer edge of the two-part frame when the upper frame rests on the lower frame.

7. Apparatus according to claim 4, in which the heating means comprises a narrow heating element secured to one of the flexible diaphragms and extending around the periphery of the assembled sheets, spaced slightly inwardly from the edge thereof.

8. Apparatus according to claim 4, including a channel extending around the inner edge of said frame exteriorly of the space between the two flexible diaphragms, and a connection to said channel for applying vacuum thereto when vacuum is applied to the space around the peripheral edges of the assembled sheets to balance the pressure over the marginal area of the assembled sheets.

9. Apparatus for presealing the marginal area only of laminated glass and plastic sheets comprising two sheets of bent glass and a sheet of plastic material therebetween assembled in superimposed relation, which apparatus comprises, in combination, a lower frame, a flexible diaphragm covering the lower frame and secured thereto, a matching upper frame, a flexible diaphragm covering the upper frame and secured thereto, means providing a seal between the diaphragms at the edges of the frames when the upper frame rests on the lower frame with the assembled sheets therebetween, a connection for evacuating the space within the frames between the flexible diaphragms to cause the atmosphere to press the flexible diaphragms inwardly against the assembled sheets, means overlying marginal areas of the flexible diaphragms for relieving the inward pressure on the flexible diaphragms over a marginal area thereof extending a limited distance inwardly beyond the peripheral edge of the assembled sheets, and heater means between the flexible diaphragms extending around the periphery of the assembled sheets.

10. Apparatus for presealing the marginal area only of laminated glass and plastic sheets comprising two sheets of bent glass and a sheet of plastic material therebetween assembled in superimposed relation, which apparatus comprises, in combination, means providing a resilient surface conforming to the shape of the assembled sheets for supporting the assembled sheets, a flexible diaphragm overlying the assembled sheets, means providing a seal between the outer edges of the resilient supporting means and the flexible diaphragm, a connection for evacuating the sealed space between the resilient supporting means and the flexible diaphragm, whereby the atmosphere causes the flexible diaphragm to press the assembled sheets against the resilient supporting means, and narrow heating elements secured to the resilient supporting surface and to the diaphragm and extending around the periphery of the assembled sheets for applying heat to the marginal area only of the assembled sheets while they are pressed between the resilient supporting means and the flexible diaphragm.

11. Apparatus according to claim 10, including a channel extending exteriorly of the flexible diaphragm around its periphery, and a connection to said channel for applying a vacuum to that portion of the upper surface of the flexible diaphragm overlying the marginal area of the assembled sheets for a limited time to delay the application of atmospheric pressure to the marginal area of the assembled sheets.

12. The method of making laminated glass and plastic sheets comprising a plurality of sheets of glass with interposed sheets of thermoplastic material, which method includes the steps of assembling said sheets in superimposed relation, evacuating air from between said sheets while applying pressure to all except a marginal area thereof, applying heat to a marginal area only of said sheets extending around the periphery of said assembled sheets and extending inwardly a limited distance from the peripheral edges thereof, and extending the pressure area on the assembled sheets to include the heated marginal area to seal the glass sheets to the thermoplastic sheets along said marginal area.

13. In the manufacture of bent laminated glass and plastic sheets comprising a plurality of sheets of bent glass with interposed sheets of thermoplastic material, the method which includes the steps of assembling the sheets in superimposed relation, removing air from between the assembled sheets by evacuating air from around their edges while applying pressure uniformly to all except a narrow marginal area of the assembled sheets extending entirely around the periphery of the sheets, heating the said narrow marginal area only of the assembled sheets and, while continuing the evacuating and heating steps, extending the pressure area on the assembled sheets to include the heated marginal area and seal the assembled sheets together in the said marginal area.

14. In the manufacture of bent laminated glass and plastic sheets comprising a plurality of sheets of bent glass with interposed sheets of thermoplastic material, the method of preparing the sheets for direct immersion in an autoclave where they will be subjected to heat and pressure to obtain an adhesive bond between the glass sheets and the interposed sheets of thermoplastic material throughout their areas, which method includes the steps of assembling the sheets in superimposed relation, removing air from between the assembled sheets by evacuating air from around their edges, heating a marginal area only of the assembled sheets extending entirely around the periphery of the assembled sheets and inwardly a limited distance from the edges thereof and, while continuing the evacuating and heating steps, applying pressure to the heated marginal area of the assembled sheets to seal the sheets together throughout the said marginal area.

BROOK J. DENNISON.
LAURENCE A. KEIM.
WILLIAM G. SMITH.

References Cited in the file of this patent
UNITED STATES PATENTS

| Number | Name | Date |
|---|---|---|
| 1,732,023 | Lytle | Oct. 15, 1929 |
| 1,782,852 | Jeffray | Nov. 25, 1930 |
| 1,870,284 | Drake | Aug. 9, 1932 |
| 1,960,580 | Fraser | May 29, 1934 |
| 2,054,864 | Owen | Sept. 22, 1936 |
| 2,064,514 | Balz | Dec. 15, 1936 |
| 2,068,104 | Haux | Jan. 19, 1937 |
| 2,075,726 | Kamerer | Mar. 30, 1937 |
| 2,466,078 | Boicey | Apr. 5, 1949 |